(12) United States Patent
Toyoshima

(10) Patent No.: US 11,884,032 B2
(45) Date of Patent: Jan. 30, 2024

(54) PRODUCTION METHOD FOR SPECTACLE LENS MOLDING MOLD AND PRODUCTION METHOD FOR SPECTACLE LENS

(71) Applicant: HOYA LENS THAILAND LTD., Pathumthani (TH)

(72) Inventor: Yoshiaki Toyoshima, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 16/650,739

(22) PCT Filed: Dec. 18, 2018

(86) PCT No.: PCT/JP2018/046522
§ 371 (c)(1),
(2) Date: Mar. 25, 2020

(87) PCT Pub. No.: WO2019/124354
PCT Pub. Date: Jun. 27, 2019

(65) Prior Publication Data
US 2021/0387430 A1    Dec. 16, 2021

(30) Foreign Application Priority Data
Dec. 19, 2017   (JP) ................................. 2017-242802

(51) Int. Cl.
*B29D 11/00*     (2006.01)
*B29C 33/38*     (2006.01)
(Continued)

(52) U.S. Cl.
CPC .... *B29D 11/00326* (2013.01); *B29C 33/3842* (2013.01); *B29C 33/424* (2013.01);
(Continued)

(58) Field of Classification Search
CPC .......... B29D 11/00326; B29D 11/0048; B29D 11/00413; B29C 3/56; B29C 33/3842; B29C 33/424; B29C 45/372; G02B 1/041
See application file for complete search history.

(56) References Cited

U.S. PATENT DOCUMENTS 6,491,851 B1 * 12/2002 Keller ................... B29C 39/025
                                                    264/1.32
8,523,354 B2 *  9/2013 Haddock ................ G02C 7/022
                                                    351/159.42
(Continued)

FOREIGN PATENT DOCUMENTS

CN          104678572 A      6/2015
EP          0878291 A1      11/1998
(Continued)

OTHER PUBLICATIONS

PCT/JP2018/046522, English translation of International Search Report issued Mar. 26, 2019, 1 page.
(Continued)

*Primary Examiner* — Mathieu D Vargot
(74) *Attorney, Agent, or Firm* — Kilpatrick Townsend & Stockton LLP

(57) ABSTRACT

Provided are a method with which a spectacle lens molding mold having a minute recess can be made with high accuracy, and the like. A method for producing a molding mold 12 for molding a spectacle lens 1 in which a minute protrusion 6 is formed on at least one surface thereof includes a first molding mold preparation step of preparing a first mold 14 that includes a base material 26 and a coating portion 28, the coating portion being made of a nickel alloy, coating the base material, and having a surface formed into a shape corresponding to the shape of one surface of the spectacle lens; and a cutting step of cutting a recess 28A
(Continued)

corresponding to the protrusion into the surface of the coating portion of the first mold.

6 Claims, 4 Drawing Sheets

(51) Int. Cl.
| | | |
|---|---|---|
| *B29C 33/42* | (2006.01) | |
| *B29C 33/56* | (2006.01) | |
| *B29C 45/37* | (2006.01) | |
| *G02B 1/04* | (2006.01) | |
| *B29K 69/00* | (2006.01) | |
| *B29L 11/00* | (2006.01) | |

(52) U.S. Cl.
CPC ............ *B29C 33/56* (2013.01); *B29C 45/372* (2013.01); *B29D 11/0048* (2013.01); *G02B 1/041* (2013.01); *B29K 2069/00* (2013.01); *B29K 2905/08* (2013.01); *B29L 2011/0016* (2013.01)

(56) References Cited

U.S. PATENT DOCUMENTS

| | | |
|---|---|---|
| 2013/0120707 A1 | 5/2013 | Shan et al. |
| 2013/0120717 A1 | 5/2013 | Okamoto |
| 2015/0160477 A1 | 6/2015 | Dai |
| 2016/0306192 A1 | 10/2016 | Marshall et al. |
| 2017/0131567 A1 | 5/2017 | To et al. |
| 2017/0184875 A1 | 6/2017 | Newman |
| 2019/0033619 A1 | 1/2019 | Neitz et al. |
| 2019/0129070 A1* | 5/2019 | Chien ................ B29D 11/0048 |
| 2020/0012123 A1 | 1/2020 | Newman |
| 2020/0073147 A1 | 3/2020 | Bakaraju et al. |

FOREIGN PATENT DOCUMENTS

| | | |
|---|---|---|
| JP | H09-85749 A | 3/1997 |
| JP | 2005-14336 A | 1/2005 |
| WO | 2015/147758 A1 | 10/2015 |
| WO | 2016168746 A1 | 10/2016 |
| WO | 2018/026697 A1 | 2/2018 |
| WO | 2018/076057 A1 | 5/2018 |

OTHER PUBLICATIONS

CN201880082743.4, "First Office Action with Machine Translation", dated Jul. 30, 2021, 16 pages.

眼镜片的计算,, "Calculation of Eye Lenses", Optometry & Glasses Fitting, 2001, 21-22.

EP18890520.2, "Extended European Search Report", dated Aug. 18, 2021, 8 pages.

"Fabrication of a Micro Lens Array with a high filling factor using a direct molding method", Materials Science Forum vols. 773-774, 2014, pp. 712-721.

CN2018800827434, "Office Action", dated Oct. 11, 2022, 8 pages.

Zhang et al., "Slow slide servo turning of compound eye lens", Optical Engineering 52(2), 023401, Feb. 2013, 8 pages.

\* cited by examiner

PRODUCTION METHOD FOR SPECTACLE LENS MOLDING MOLD AND PRODUCTION METHOD FOR SPECTACLE LENS

CROSS-REFERENCE TO RELATED APPLICATIONS

This application a National Stage of International Application No. PCT/JP2018/046522, filed Dec. 18, 2018, which claims priority to Japanese Patent Application No. 2017-242802, filed Dec. 19, 2017, and the contents of which are incorporated by reference in their entirety.

TECHNICAL FIELD

The present disclosure relates to a method for producing a spectacle lens molding mold and a method for producing a spectacle lens, and particularly relates to a method for producing a spectacle lens molding mold for use in production of a spectacle lens that has a protrusion on a surface thereof and a method for producing a spectacle lens that has a protrusion on a surface thereof.

BACKGROUND ART

Patent Document 1 discloses a spectacle lens that suppresses the progression of ametropia such as myopia, and in which minute protrusions (segments) having a substantially hemispherical surface shape with a diameter of about 1 mm, for example, are formed on a convex surface of a plastic lens.

In a method for producing a spectacle lens, a thermosetting resin is used as the material of a spectacle lens, and a molding mold made of a glass material is used as the molding mold. When producing a spectacle lens, such as the one disclosed in Patent Document 1, that has minute protrusions on a convex surface thereof using such a method, a method is conceivable in which a plurality of minute recesses are formed in one molding surface of the molding mold made of the glass material.

CITATION LIST

Patent Documents

Patent Document 1: US 2017/131567 A1

SUMMARY OF DISCLOSURE

Technical Problem

Examples of the method for forming recesses in a molding surface of a molding mold made of a glass material include methods in which recesses are formed through grinding and polishing, laser beam machining, or the like.

These methods, however, are highly likely to cause chipping or the like of the glass material during the formation of minute recesses in the surface of the molding mold. For this reason, conditions required of the minute protrusions, such as processing accuracy of curved surfaces, roughness, and dimensional accuracy, cannot be satisfied, and it is therefore difficult to produce a molding mold.

The present disclosure was made in view of the above-described problems, and it is difficult to provide a highly accurate spectacle lens molding mold having a minute recess.

Solution to Problem

According to the present disclosure, provided is a method for producing a molding mold for molding a spectacle lens in which a minute protrusion is formed on at least one surface thereof, the method including:
- a first molding mold preparation step of preparing a first mold that includes a base material and a coating portion, the coating portion being made of a nickel alloy, coating the base material, and having a surface formed into a shape corresponding to a shape of one surface of the spectacle lens; and
- a cutting step of cutting a recess corresponding to the protrusion into a surface of the coating portion of the first mold.

With this configuration, since the recess is formed by cutting the surface of the nickel alloy, which is a ductile material, chipping and the like of the molding mold do not occur during the formation of the recess. Thus, a spectacle lens molding mold having a minute recess can be made with high accuracy.

According to another aspect of the present disclosure,
a method for producing a spectacle lens with use of a molding mold that has been produced using the method for producing a spectacle lens molding mold according to claim 1 includes:
- a step of defining a lens molding space by holding the first mold and a second mold spaced apart from each other by a predetermined distance, the second mold having a surface formed into a shape corresponding to a shape of another surface of the spectacle lens;
- a resin loading step of loading a resin into the space between the first mold and the second mold; and
- a release step of removing a spectacle lens composed of the cured resin from the first mold and the second mold.

According to another preferred aspect of the present disclosure, a surface of the protrusion has a substantially hemispherical shape.

According to another preferred aspect of the present disclosure, the resin is a thermoplastic resin.

Advantageous Effects of Disclosure

According to the present disclosure, it is possible to provide a highly accurate spectacle lens molding mold having a minute recess.

DESCRIPTION OF EMBODIMENTS

Hereinafter, a method for producing a spectacle lens molding mold according to a preferred embodiment of the present disclosure will be described.

Figure 1:
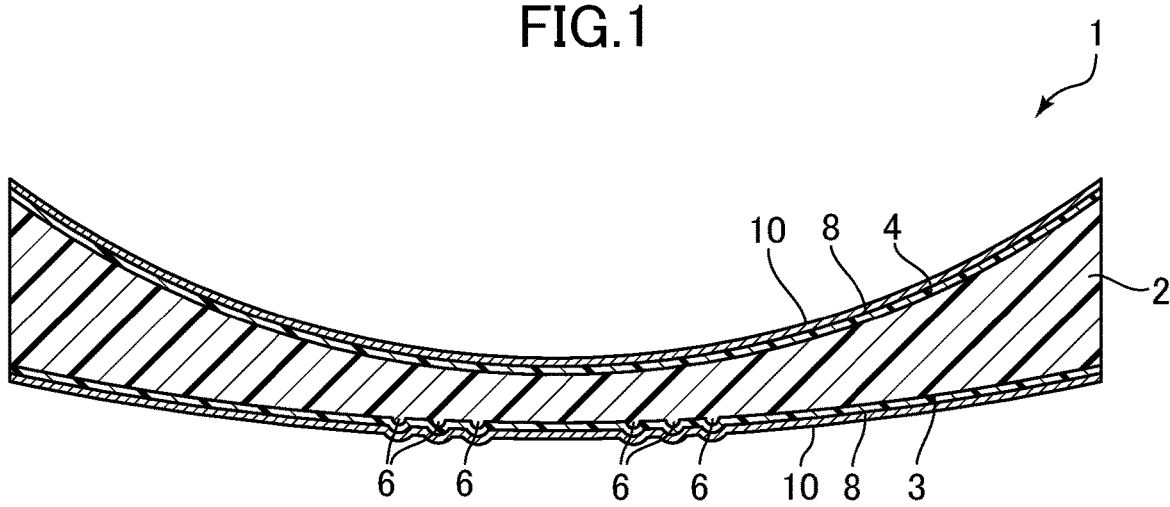
FIG. 1 is a cross-sectional view showing a spectacle lens molded in a molding mold that has been produced using a method for producing a spectacle lens molding mold according to an embodiment of the present disclosure.

FIG. 1 is a cross-sectional view showing a spectacle lens 1 molded in a molding mold that has been produced using a method for producing a spectacle lens molding mold according to an embodiment of the present disclosure.

As shown in FIG. 1, the spectacle lens 1 includes a spectacle lens main body 2, and the spectacle lens main body 2 has a convex surface 3 and a concave surface 4. The spectacle lens 1 further includes hard coating layers 8 formed on the convex surface 3 and the concave surface 4 of the spectacle lens main body 2, as well as antireflection films (AR films) 10 formed on the surfaces of the hard coating layers 8.

Minute protrusions (projections) 6 are formed on the convex surface 3 of the spectacle lens main body 2 such that the protrusions 6 are arranged around the central axis of the spectacle lens main body 2 at regular intervals in the circumferential direction and the radial direction. The surface of each protrusion 6 has, for example, a substantially hemispherical shape with a diameter of 1 mm, a height of 0.8 μm, and a curvature of 86 mmR.

In the present embodiment, the spectacle lens main body 2 is made of a thermoplastic resin such as polycarbonate, but the resin constituting the spectacle lens main body 2 may be chosen from other resins with which a desired refractivity can be obtained.

As also disclosed in Patent Document 1 above, it is known that the progression of ametropia, such as myopia, of a spectacle wearer can be suppressed by forming a minute protrusion (segment) on a convex surface (object-side surface) of a spectacle lens. This is based on the principle that forming a minute protrusion whose surface has a curvature that is different from the curvature of the convex surface of a base portion of the spectacle lens makes it possible for light to be also focused on a position other than the retina, thereby suppressing the progression of myopia.

Here, the refractive power of a minute protrusion is preferably 2.00 to 5.00 diopters greater than the refractive power of the base portion of the spectacle lens. Also, the diameter of a minute protrusion is preferably about 0.8 to 2.0 mm. Note that the refractive power of a lens depends on the refractive index of the material thereof, the curve (radius of curvature) of a front surface, the curve (radius of curvature) of a back surface, and the thickness of the lens.

Therefore, the curve (radius of curvature) of a minute protrusion and the thickness (height of the minute protrusion) thereof are preferably determined such that the refractive power of the minute protrusion is 2.00 to 5.00 diopters greater than the refractive power of the base portion of the spectacle lens. Specifically, it is preferable that the height of the minute protrusion is 0.1 to 10 μm, and the curvature of the surface of the minute protrusion is 50 to 250 mmR. Moreover, it is preferable that the distance between adjacent minute protrusions is approximately equal to the value of the radius of the minute protrusions. Furthermore, it is preferable that the plurality of minute protrusions are substantially uniformly arranged near the center of the lens.

Next, a molding mold that is used to produce a spectacle lens 1 will be described.

Figure 2:
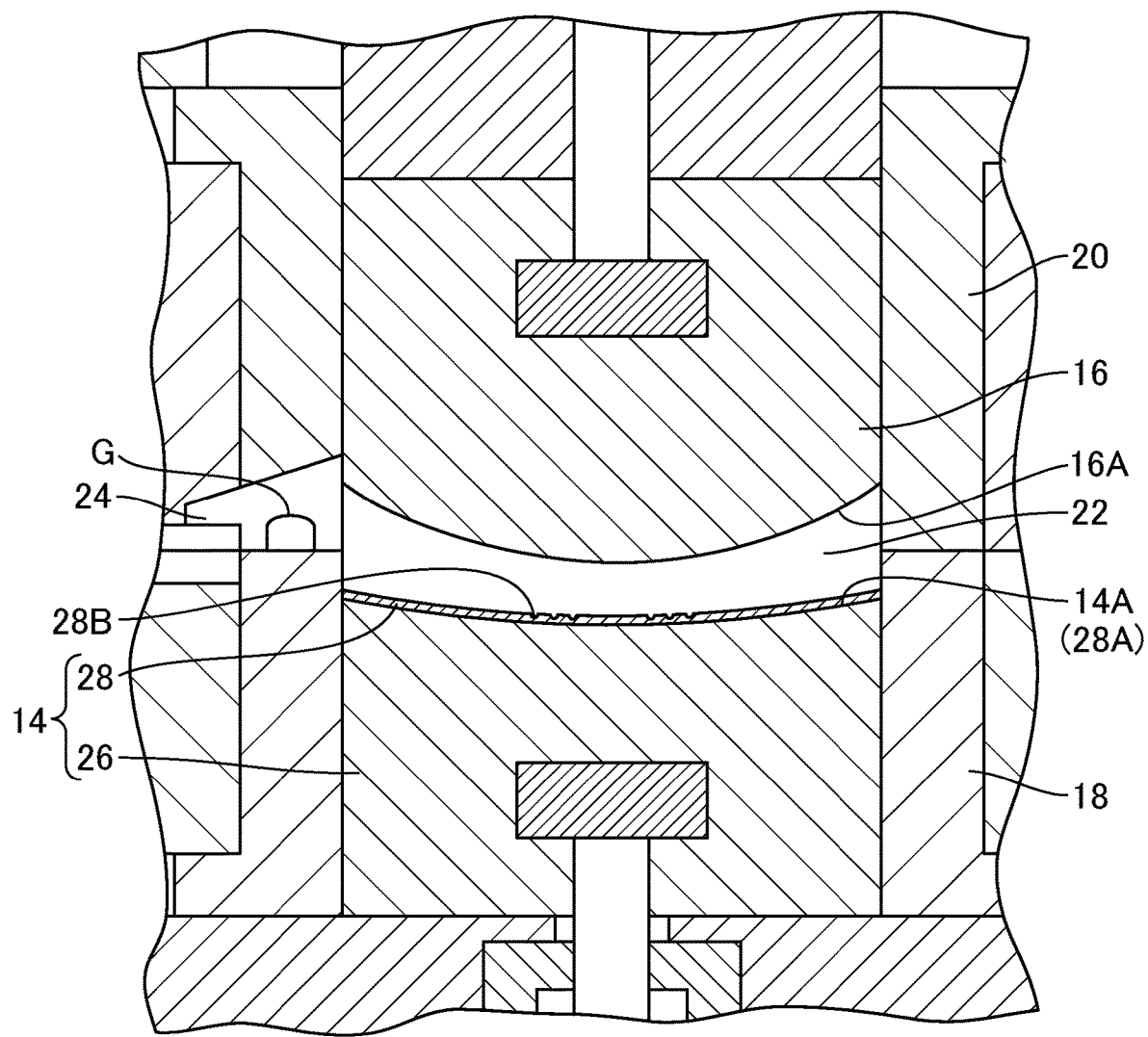
FIG. 2 shows a molding mold produced using the method for producing a spectacle lens molding mold according to the embodiment of the present disclosure.

FIG. 2 is a diagram showing a state in which a molding mold that has been produced using the method for producing a spectacle lens molding mold according to the embodiment of the present disclosure is attached to a known molding device for use in an injection method that uses a thermoplastic resin.

As shown in FIG. 2, a molding mold 12 that is used to produce a spectacle lens 1 includes a fixed mold-side insert (first mold) 14 having a concave molding surface 14A, a movable mold-side insert (second mold) 16 having a convex molding surface 16A, as well as a fixed mold-side insert guide member 18 and a movable mold-side insert guide member 20 in which the fixed mold-side insert 14 and the movable mold-side insert 16, respectively, are slidably accommodated.

The fixed mold-side insert 14 and the movable mold-side insert 16 are arranged inside the fixed mold-side insert guide member 18 and the movable mold-side insert guide member 20, respectively, such that the molding surfaces 14A and 16A oppose each other and form a cavity 22 therebetween.

A leading end of a runner 24 opens into the cavity 22 via a gate G so that a molten resin can be injected into the cavity 22.

The fixed mold-side insert 14 has a base material 26 that is made of a metal such as stainless steel and has a concave surface 26A formed into a shape corresponding to the convex surface 3 of the spectacle lens, and a coating layer 28 that is formed on the concave surface 26A of the base material 26.

The coating layer 28 is composed of NiP (electroless nickel plating) or the like, for example. The coating layer 28 has a uniform thickness, and a surface 28A thereof constitutes the molding surface 14A of the fixed mold-side insert 14. Recesses 28B having a shape that is complementary to that of the protrusions 6 formed on the convex surface 3 of the spectacle lens main body 2 are formed in the surface (molding surface 14A) 28A of the coating layer 28.

The movable mold-side insert 16, the fixed mold-side insert guide member 18, and the movable mold-side insert guide member 20 are also composed of a metal material such as stainless steel, for example.

Hereinafter, a method for producing the fixed mold-side insert 14 of the molding mold 12 shown in FIG. 2 will be described. FIGS. 3A to 3D are diagrams for illustrating the method for producing the fixed mold-side insert 14.

Figure 3A:
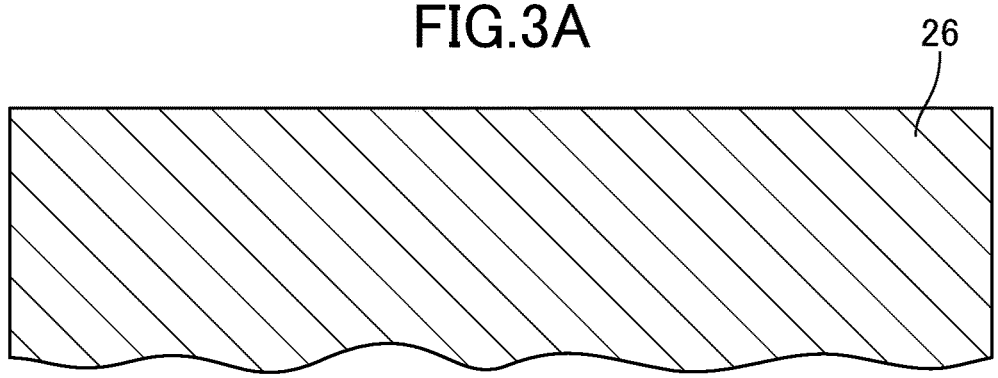
FIG. 3A is a diagram (first diagram) for illustrating a method for producing a first mold of the molding mold shown in FIG. 2.

First, as shown in FIG. 3A, a solid cylindrical (disc-shaped) base material 26 made of stainless steel is prepared.

Figure 3B:
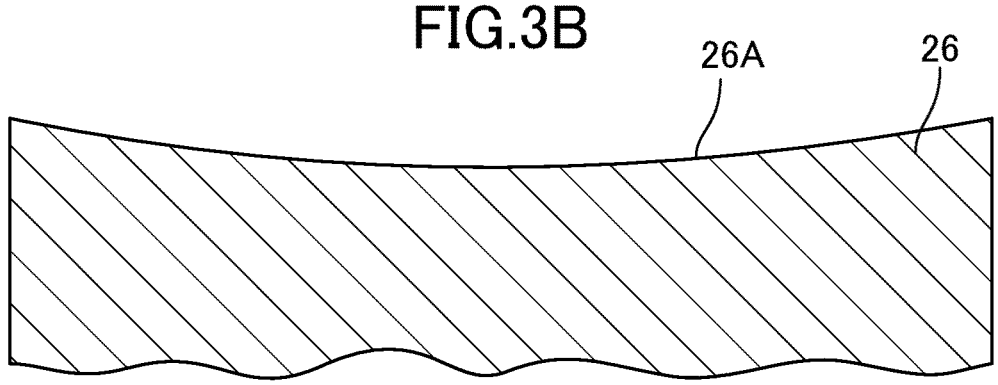
FIG. 3B is a diagram (second diagram) for illustrating the method for producing a first mold of the molding mold shown in FIG. 2.

Next, as shown in FIG. 3B, one face (upper face in FIG. 3B) of the base material 26 is cut into a desired curved surface shape corresponding to the convex surface 3 of the spectacle lens 1 to form the concave surface 26A.

Figure 3C:
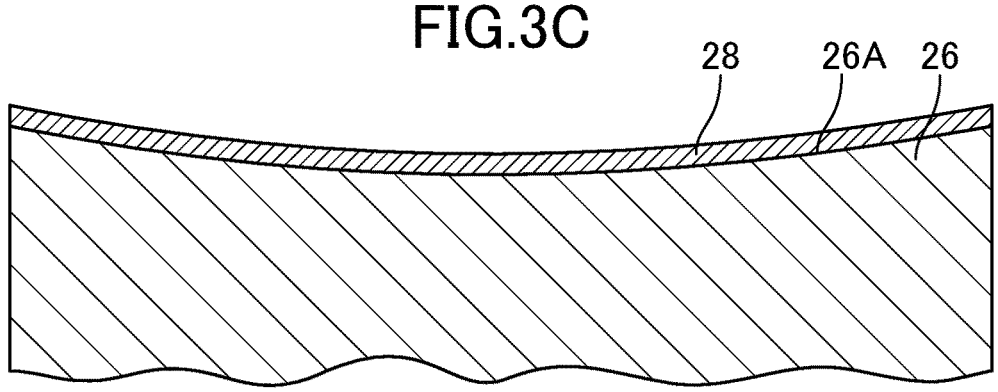
FIG. 3C is a diagram (third diagram) for illustrating the method for producing a first molding mold of the molding mold shown in FIG. 2.

Next, as shown in FIG. 3C, Ni—P (electroless nickel plating) is applied to the concave surface 26A of the base material 26 to form the coating layer 28 made of a nickel alloy on the concave surface 26A. The surface of the coating layer 28 has a shape that corresponds to the convex surface 3 of the spectacle lens 1. The processes that have been described with reference to FIGS. 3A to 3C correspond to a first molding mold preparation step.

Figure 3D:
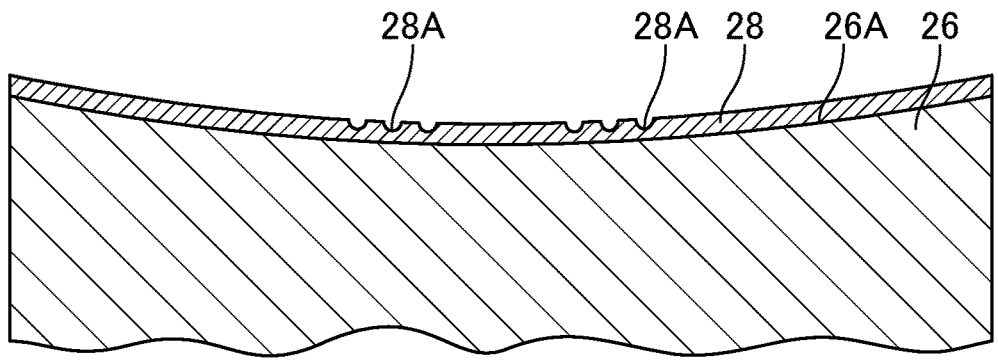
FIG. 3D is a diagram (fourth diagram) for illustrating the method for producing a first molding mold of the molding mold shown in FIG. 2.

Next, as shown in FIG. 3D, the hemispherical recesses 30A are formed through ultra-precision micromachining at a plurality of positions corresponding to the protrusions 6 of the spectacle lens 1, of the coating layer 28 made of the nickel alloy, which is a ductile material. This process corresponds to a cutting step.

In the above-described manner, the fixed mold-side insert 14 of the molding mold shown in FIG. 2 is produced.

Simultaneously with this, the movable mold-side insert 16 as well as the fixed mold-side insert guide member 18 and the movable mold-side insert guide member 20 are produced. The movable mold-side insert 16 can be produced by, for example, cutting one face of a solid cylindrical base material made of stainless steel into a shape corresponding to the concave surface 4 of the spectacle lens. This process corresponds to a second molding mold preparation step.

Next, a method for molding the spectacle lens 1 with use of the molding mold 12 that has been produced in the above-described manner will be described. FIGS. 4A to 4D are diagrams for illustrating the method for molding a spectacle lens with use of the molding mold 12.

Figure 4A:
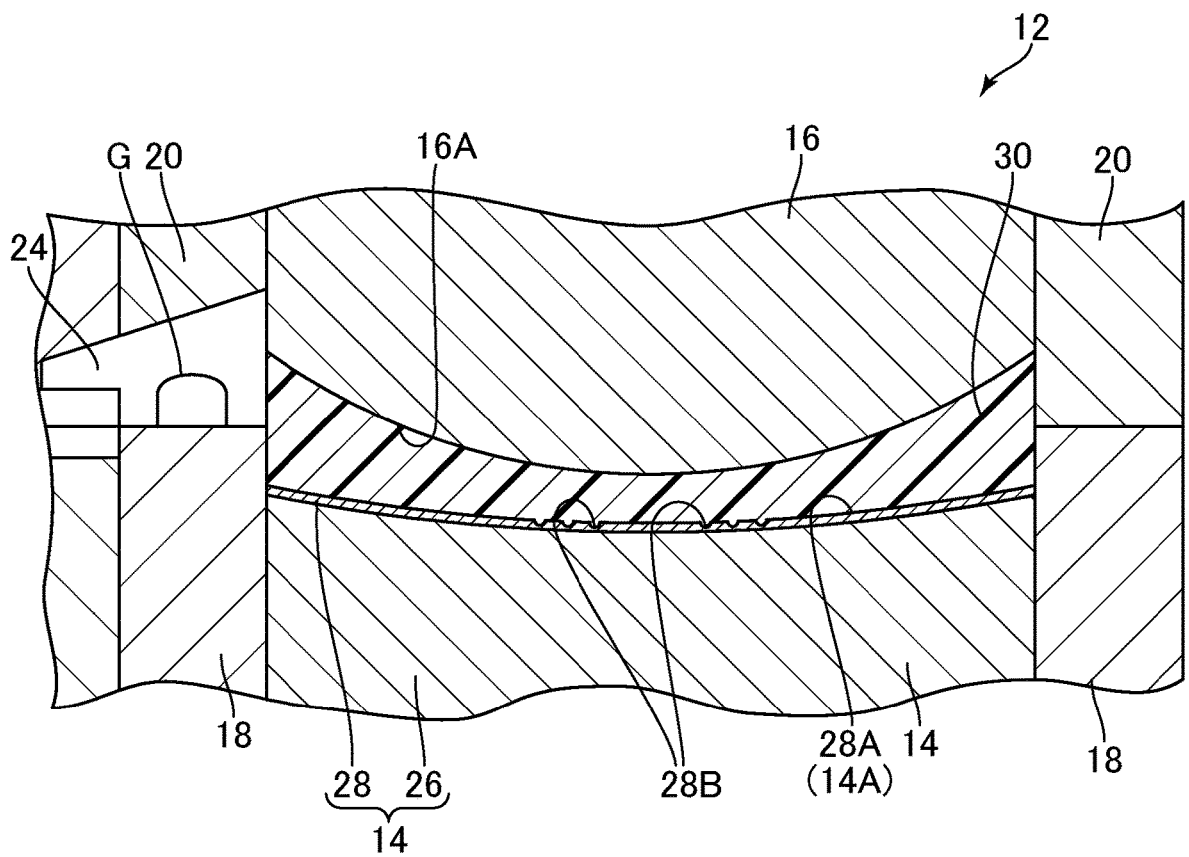
FIG. 4A is a diagram (first diagram) for illustrating a method for molding a spectacle lens with use of the molding mold shown in FIG. 2.

First, as shown in FIG. 4A, in a state in which the molding mold 12 is assembled and heated, a thermoplastic resin 30 is injected through the runner 24 into the cavity 22 formed by the fixed mold-side insert (first mold) 14, the movable mold-side insert (second mold) 16, the fixed mold-side insert guide member 18, and the movable mold-side insert guide member 20. This process corresponds to a resin loading step.

The runner 24 is closed by the gate G, and the molding mold 12 and the thermoplastic resin 30 injected therein are cooled. The thermoplastic resin 30 cures and constitutes the spectacle lens main body 2.

Figure 4B:
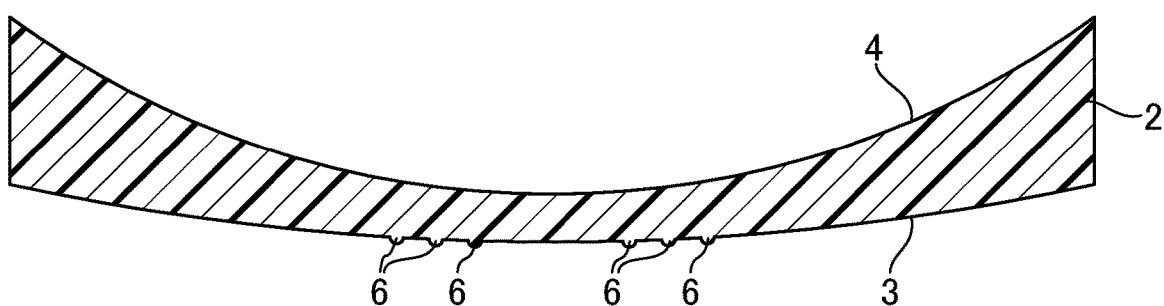
FIG. 4B is a diagram (second diagram) for illustrating the method for molding a spectacle lens with use of the molding mold shown in FIG. 2.

Next, as shown in FIG. 4B, the spectacle lens main body 2 is released from the molding mold 12. This process corresponds to a release step. Thus, the spectacle lens main body 2 in which the plurality of minute protrusions 6 are formed on the convex surface 3 can be produced.

Figure 4C:
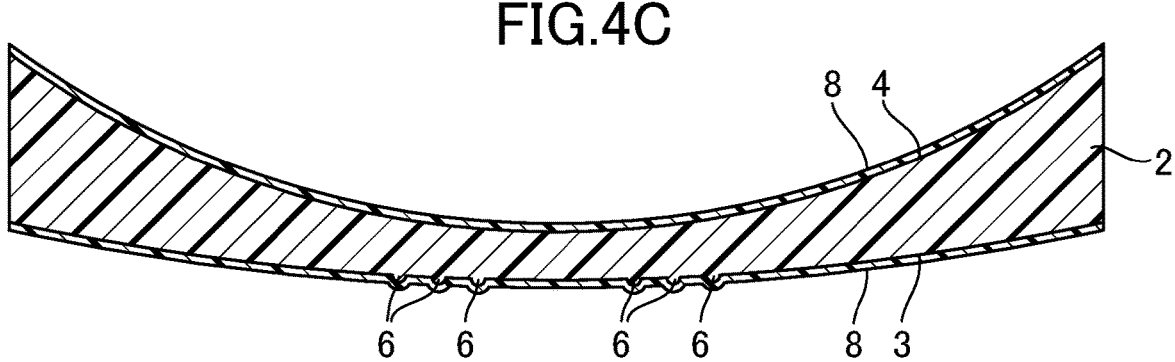
FIG. 4C is a diagram (third diagram) for illustrating the method for molding a spectacle lens with use of the molding mold shown in FIG. 2.

Next, as shown in FIG. 4C, the hard coating layers 8 are formed on the convex surface 3 and the concave surface 4 of the spectacle lens main body 2. The hard coating layers 8 can be formed, for example, using a method in which the spectacle lens main body 2 is dipped into a hard coating solution such as a silicone resin, spin coating, or the like.

Figure 4D:
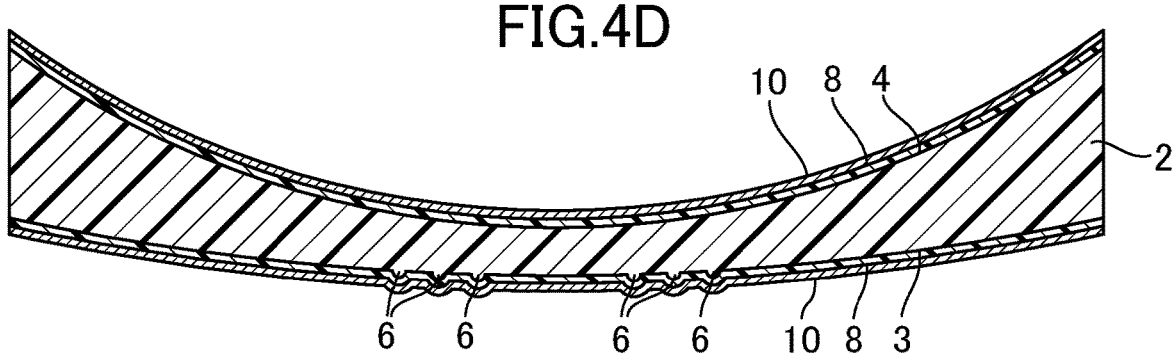
FIG. 4D is a diagram (fourth diagram) for illustrating the method for molding a spectacle lens with use of the molding mold shown in FIG. 2.

Next, as shown in FIG. 4D, the antireflection films 10 are formed on the surfaces of the hard coating layers 8. The antireflection films 10 can be formed by, for example, depositing layers of an antireflection agent, such as $ZrO_2$, $MgF_2$, or $Al_2O_3$, through vacuum deposition.

The spectacle lens is produced as a result of the above-described processes.

With the method for producing a spectacle lens molding mold of the present embodiment, the following effects are achieved.

According to the present embodiment, the recesses 28B are formed by forming the coating layer 28 made of a nickel alloy, which is a ductile material, and cutting the surface of the coating layer 28. Therefore, chipping and the like of the molding surface do not occur, and thus, a spectacle lens molding mold 12 having minute recesses 28B can be made with high accuracy.

Note that the present disclosure is not limited to the present embodiment that has been described above, and changes may be made thereto as appropriate without departing from the scope of the technical idea of the present disclosure.

For example, in the present embodiment, a case where the hemispherical protrusions 6 are formed on the convex surface 3 of the spectacle lens main body 2 has been described; however, the shape of the protrusions 6 is not limited to this. Moreover, protrusions may be formed on the concave surface 4.

In the method for producing a spectacle lens of the foregoing embodiment, the spectacle lens is produced through injection using a thermoplastic resin as the raw material resin; however, a spectacle lens may also be produced through casting using a thermosetting resin as the resin material.

Figure 5:
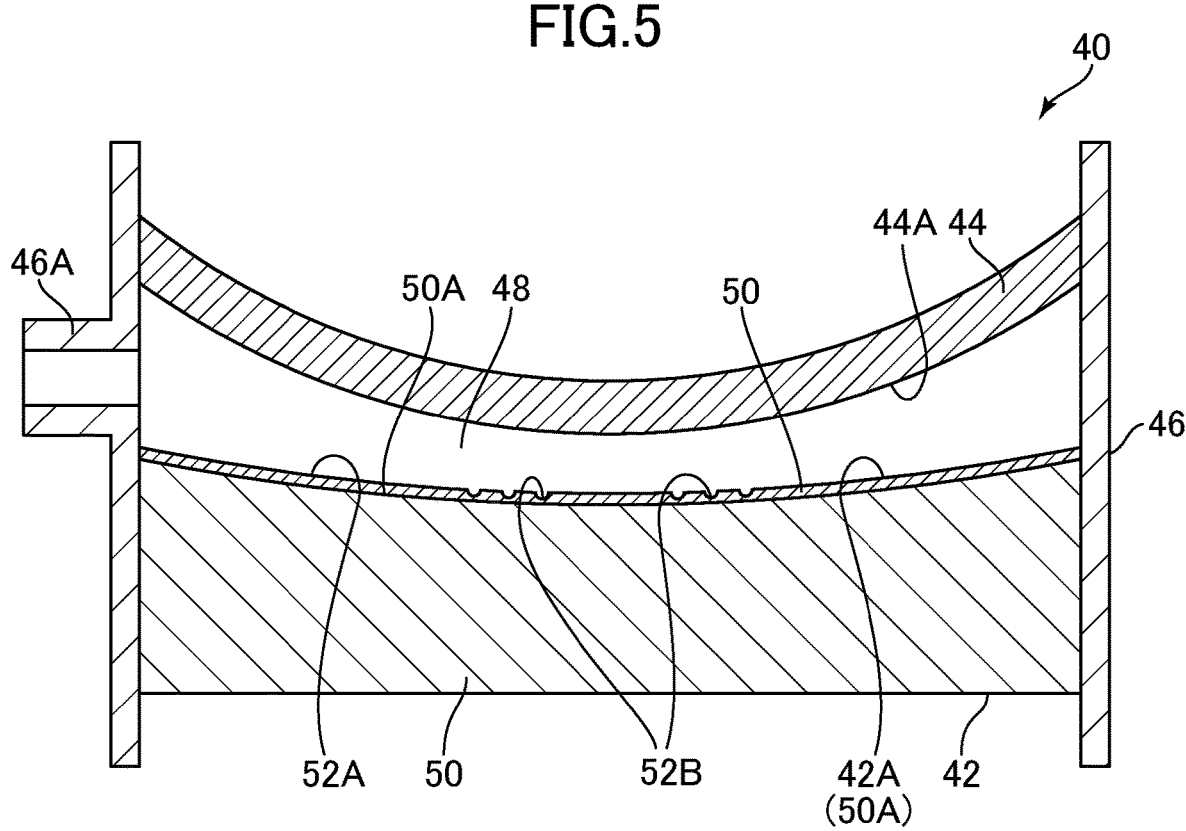
FIG. 5 is a diagram for illustrating another method for molding a spectacle lens with use of the molding mold shown in FIG. 2.

FIG. 5 is a diagram schematically showing a molding mold that is used to produce a spectacle lens through casting that is mentioned above. As shown in FIG. 5, a molding mold 40 that is used to produce a spectacle lens includes a first mold 42 having a concave molding surface 42A, a second mold 44 having a convex molding surface 44A, and a hollow cylindrical gasket 46. The first mold 42 and the second mold 44 are arranged inside the gasket 46 so as to form a cavity 48 between the molding surfaces 42A and 44A opposing each other.

The first mold 42 has a base material 50 that is made of stainless steel and has a concave surface 50A formed into a shape corresponding to the convex surface 3 of the spectacle lens, and a coating layer 52 that is formed on the concave surface 50A of the base material 50. The base material 50 is made of a material such as stainless steel, for example.

The coating layer 52 is made of NiP (electroless nickel plating) or the like, for example. The coating layer 52 has a uniform thickness, and a surface 50A thereof constitutes the molding surface 42A of the first molding mold 42. Recesses 50B having a shape that is complementary to that of the protrusions 6 formed on the convex surface 3 of the spectacle lens main body 2 are formed in the surface 50A (molding surface 42A) of the coating layer 52.

The second mold 44 and the gasket 46 are composed of a metal material such as stainless steel, for example. An injection port 46A that is in communication with a cylindrical space inside the gasket 46 is formed in a side portion of the gasket 46.

The first mold 42 of the molding mold 40 shown in FIG. 5 is produced using a similar method to the method for producing the fixed mold-side insert (first mold) 14 of the above-described embodiment.

A solid cylindrical base material 50 made of stainless steel is prepared. One face of the base material 50 is cut into a desired curved surface shape corresponding to the convex surface 3 of the spectacle lens 1 to form the concave surface 50A.

Next, Ni—P (electroless nickel plating) is applied along the concave surface 50A of the base material 50 to form the coating layer 52 made of a nickel alloy. The surface 52A of the coating layer 52 has a shape that corresponds to the convex surface 3 of the spectacle lens 1. These processes correspond to the first molding mold preparation step.

Next, the hemispherical recesses 52B are formed through ultra-precision micromachining at positions corresponding to the protrusions 6 of the spectacle lens 1, of the coating layer 52, which is made of a ductile material. This process corresponds to the cutting step.

Simultaneously with this, the second molding mold 44 and the gasket 46 are produced. The second molding mold 44 can be produced by, for example, cutting one face of a solid cylindrical base material made of stainless steel into a shape corresponding to the concave surface 4 of the spectacle lens. This process corresponds to the second molding mold preparation step.

The thus produced molding mold 40 is assembled, and an uncured thermosetting resin is injected through the injection port 466A of the gasket 46 into the cavity 48 formed by the first molding mold 14, the second molding mold 16, the gasket 46, and the like. This process corresponds to the resin loading step.

Then, the injection port 46A of the gasket 46 is closed, and the thermoplastic resin is cured. Thus, the spectacle lens main body 2 is produced.

Next, the spectacle lens main body 2 is released from the molding mold 40. This step corresponds to the release step. Thus, the spectacle lens main body 2 in which the plurality of minute protrusions 6 are formed on the convex surface 3 is produced.

Next, the hard coating layers 8 are formed on the convex surface 3 and the concave surface 4 of the spectacle lens main body 2. The hard coating layers 8 can be formed, for example, using a method in which the spectacle lens main body 2 is dipped into a hard coating solution such as a silicone resin, spin coating, or the like.

Next, the antireflection films 10 are formed on the surfaces of the hard coating layers 8. The antireflection films 10 can be formed by, for example, depositing layers of an antireflection agent, such as $ZrO_2$, $MgF_2$, or $Al_2O_3$, through vapor deposition.

The spectacle lens is produced as a result of the above-described processes.

Note that the present disclosure is not limited to the foregoing embodiments and the like, and changes may be made thereto as appropriate without departing from the scope of the technical idea of the present disclosure.

LIST OF REFERENCE NUMERALS

1 Spectacle lens
2 Spectacle lens main body
3 Convex surface
4 Concave surface
6 Protrusion
8 Hard coating layer
10 Antireflection film
12 Molding mold
14 Fixed mold-side insert (First mold)
14A Molding surface
16 Movable mold-side insert (Second mold)
16A Molding surface
18 Fixed mold-side insert guide member
20 Movable mold-side insert guide member
26 Base material
26A Concave surface
28 Coating layer
28B Recess
30 Thermoplastic resin

The invention claimed is:

1. A method of producing a spectacle lens, the method comprising:
    defining a lens molding space by holding a first mold and a second mold spaced apart from each other by a predetermined distance, the first mold that includes a base material and a coating portion, the coating portion being made of a nickel alloy, coating the base material, and having a surface formed into a shape corresponding to a shape of one surface of the spectacle lens, the first mold having a recess corresponding to a minute protrusion into a surface of the coating portion of the first mold, the minute protrusion having a height being 0.1 to 10 μm, the second mold having a surface formed into a shape corresponding to a shape of another surface of the spectacle lens, the first mold being held at a lower position with respect to the second mold such that the recess is upwardly oriented;
    loading a resin into the space between the first mold and the second mold; and
    removing a spectacle lens composed of the cured resin from the first mold and the second mold;
    wherein a surface of the minute protrusion has a substantially hemispherical shape.

2. The method for producing a spectacle lens according to claim 1,
    wherein the resin is a thermoplastic resin.

3. The method for producing a spectacle lens according to claim 1,
    wherein the diameter of the minute protrusion is about 0.8 to 2.0 mm.

4. The method for producing a spectacle lens according to claim 2,
    wherein the curvature of the surface of the minute protrusion is 50 to 250 mmR.

5. The method for producing a spectacle lens according to claim 1,
    wherein the refractive power of the minute protrusion is larger than the refractive power of the base portion by 2.00 to 5.00 diopters.

6. The method for producing a spectacle lens according to claim 1,
    wherein there are a plurality of minute protrusions;
    wherein distance between adjacent minute protrusions is approximately equal to the value of the radius of the minute protrusions.

* * * * *